(12) United States Patent
Aoshima et al.

(10) Patent No.: US 12,049,777 B2
(45) Date of Patent: Jul. 30, 2024

(54) OPENING-CLOSING MEMBER CONTROL DEVICE AND INITIALIZATION METHOD

(71) Applicants: DENSO CORPORATION, Kariya (JP); TOYOTA JIDOSHA KABUSHIKI KAISHA, Toyota (JP)

(72) Inventors: Hiroki Aoshima, Kariya (JP); Akiyoshi Ohara, Kariya (JP); Ryo Miyazaki, Kariya (JP); Kenji Kaneko, Toyota (JP); Tsuyoshi Sugimoto, Kuwana (JP); Toshihiro Gotou, Toyota (JP); Hideki Maeda, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 303 days.

(21) Appl. No.: 17/619,917

(22) PCT Filed: Jun. 16, 2020

(86) PCT No.: PCT/JP2020/023566
§ 371 (c)(1),
(2) Date: Dec. 16, 2021

(87) PCT Pub. No.: WO2020/255950
PCT Pub. Date: Dec. 24, 2020

(65) Prior Publication Data
US 2022/0341240 A1 Oct. 27, 2022

(30) Foreign Application Priority Data
Jun. 21, 2019 (JP) .................... 2019-115364

(51) Int. Cl.
*E05F 15/40* (2015.01)
*E05F 15/695* (2015.01)

(52) U.S. Cl.
CPC ............ *E05F 15/40* (2015.01); *E05F 15/695* (2015.01); *E05Y 2400/54* (2013.01); *E05Y 2900/55* (2013.01)

(58) Field of Classification Search
CPC . B60J 1/17; E05F 15/40; E05F 15/689; E05F 15/695; E05Y 2400/32;
(Continued)

(56) References Cited

U.S. PATENT DOCUMENTS 4,872,082 A * 10/1989 Martel ................... E05F 15/40
307/119
5,734,245 A   3/1998 Terashima et al.
(Continued)

FOREIGN PATENT DOCUMENTS

JP  H07-113374 A   5/1995
JP  H08-218730 A   8/1996
(Continued)

OTHER PUBLICATIONS

Aug. 25, 2020 Search Report issued in Internatioanl Patent Application No. PCT/JP2020/023566.

*Primary Examiner* — Babar Sarwar
(74) *Attorney, Agent, or Firm* — Oliff PLC

(57) ABSTRACT

An opening-closing member controller includes a control unit that executes an initialization process to store at least a fully closed position of an opening-closing member. In the initialization process, the control unit closes the opening-closing member, executes entrapment reversing control one or more times when entrapment is detected to open the opening-closing member, and closes the opening-closing member after the entrapment reversing control to store a position where the opening-closing member locks as the fully closed position.

17 Claims, 13 Drawing Sheets

(58) Field of Classification Search
CPC ............. E05Y 2400/40; E05Y 2400/44; E05Y 2400/456; E05Y 2400/54; E05Y 2900/55
See application file for complete search history.

(56) References Cited

U.S. PATENT DOCUMENTS

| | | | | |
|---|---|---|---|---|
| 5,801,340 | A * | 9/1998 | Peter | H03K 17/962 345/174 |
| 5,986,421 | A * | 11/1999 | Fukazawa | G01D 5/1655 318/470 |
| 6,347,482 | B1 | 2/2002 | Takiguchi et al. | |
| 6,646,398 | B1 | 11/2003 | Fukazawa et al. | |
| 7,038,414 | B2 * | 5/2006 | Daniels | E05F 15/46 318/467 |
| 11,634,937 | B2 * | 4/2023 | Washeleski | E05F 15/46 701/36 |
| 2015/0372480 | A1 * | 12/2015 | Nagahama | E05F 15/659 49/26 |
| 2018/0202213 | A1 * | 7/2018 | Shitara | E05F 15/41 |

FOREIGN PATENT DOCUMENTS

| | | |
|---|---|---|
| JP | 2004-076265 A | 3/2004 |
| JP | 2005-281971 A | 10/2005 |
| JP | 2010-077616 A | 4/2010 |
| JP | 2020-186626 A | 11/2020 |

\* cited by examiner

OPENING-CLOSING MEMBER CONTROL DEVICE AND INITIALIZATION METHOD

CROSS-REFERENCE TO RELATED APPLICATIONS

The present application is based on Japanese Patent Application No. 2019-115364 filed on Jun. 21, 2019, the entire contents of which are incorporated herein by reference.

TECHNICAL FIELD

The present disclosure relates to an opening-closing member controller and an initialization method.

BACKGROUND ART

A typical opening-closing member controller for a vehicle has an entrapment prevention functionality that prevents a foreign object from being entrapped by a closing window glass. Further, there is an opening-closing member controller having a learning functionality that stores position information, such as a fully closed position of a window glass, and load information to properly implement the entrapment prevention functionality (refer to, for example, Patent Document 1).

PRIOR ART DOCUMENTS

Patent Documents

Patent Document 1: Japanese Laid-Open Patent Publication No. 2005-281971

SUMMARY OF THE INVENTION

A window glass is generally installed at a position located in the middle of an opening-closing range in, for example, an assembly plant. When an opening-closing member controller is initialized, the window glass is moved from the middle position to the fully open position and then further moved from the fully open position to the fully closed position to store information of the fully open position and information of the fully closed position in the controller. The initialization is performed under a situation in which there is no information of the fully closed position and no information of a dead zone in the vicinity of the fully closed position where the entrapment prevention functionality is disabled. Generally, the entrapment prevention functionality is thus disabled when a worker operates an operation switch to fully open and fully close the window glass.

Therefore, in the above initialization process, the entrapment prevention functionality is disabled when a closing action is performed for the first time. Thus, a foreign object cannot be detected during the initialization. Further, when a member such as a weather strip or the like is used in an initial state, the member is still new and has never been bent. Thus, the member may lock the window glass before the intended fully closed position when the window glass is closed for the first time. In such a case, the stored fully closed position may not be correct.

It is an objective of the present disclosure to provide an opening-closing member controller and an initialization method that allow for entrapment detection during initialization and allow storage of a fully closed position to be little affected by the initial state of a weather strip.

In one aspect of the present disclosure, an opening-closing member controller includes a control unit that executes an initialization process to store at least a fully closed position of an opening-closing member. In the initialization process, the control unit closes the opening-closing member, executes entrapment reversing control one or more times when entrapment is detected to open the opening-closing member, and closes the opening-closing member after the entrapment reversing control to store a position where the opening-closing member locks as the fully closed position.

With this configuration, in the initialization process, the control unit closes the opening-closing member, executes entrapment reversing control one or more times when entrapment is detected to open the opening-closing member, and closes the opening-closing member after the entrapment reversing control to store a position where the opening-closing member locks as the fully closed position. This detects entrapment in the initialization process. Further, the entrapment reversing control executed one or more times allows adjustments to be made to, for example, a member such as a weather strip in the initial state and stores the position where the opening-closing member locks as the fully closed position after the adjustments. This correctly stores the fully closed position and reduces the adverse effects of the weather strip in the initial state.

In another aspect of the present disclosure, an initialization method is applied for storing at least a fully closed position of an opening-closing member in an opening-closing member controller. The initialization method includes executing entrapment reversing control one or more times that opens the opening-closing member if entrapment is detected when closing the opening-closing member. The initialization method also includes storing a position where the opening-closing member locks when closing the opening-closing member after the entrapment reversing control as a fully closed position.

This method closes the opening-closing member, executes entrapment reversing control one or more times when entrapment is detected to open the opening-closing member, and closes the opening-closing member after the entrapment reversing control to store a position where the opening-closing member locks as the fully closed position. This detects entrapment in the initialization process. Further, entrapment performed one or more times allows adjustments to be made to, for example, a member such as a weather strip in the initial state and stores the position where the opening-closing member locks as the fully closed position after the adjustments. This correctly stores the fully closed position and reduces the adverse effects of the weather strip in the initial state.

BRIEF DESCRIPTION OF THE DRAWINGS

The objective, other objectives, features, and advantages of the present disclosure will be clear in the detailed description below with reference to the accompanying drawings.

MODES FOR CARRYING OUT THE INVENTION

A power window device according to one embodiment will now be described with reference to FIGS. 1 to 5E.

Figure 1:
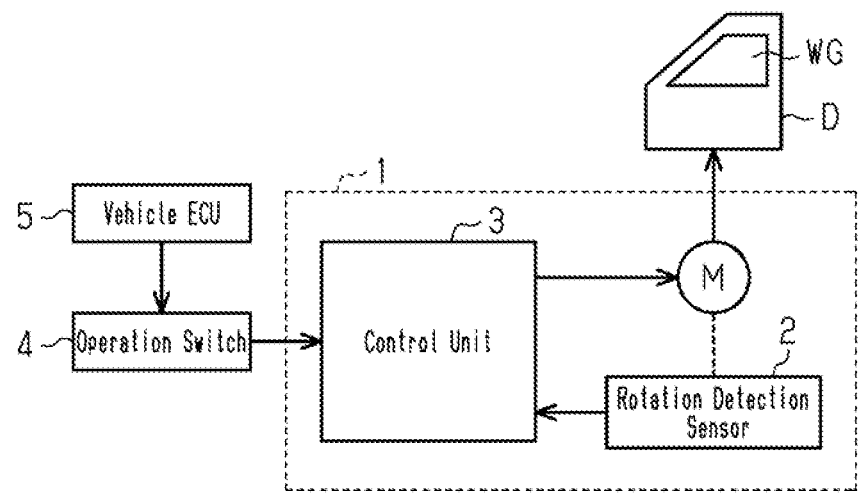
FIG. 1 is a schematic diagram of a power window device according to one embodiment.

As shown in FIG. 1, a vehicle door D includes a window glass WG that serves as an opening-closing member and moves in the vertical direction. The window glass WG is drive-connected to a motor M by a regulator or the like (not shown) in a power window controller 1 that serves as an opening-closing member controller for a vehicle.

The power window controller 1 includes a rotation detection sensor 2 such as a Hall IC that detects the rotation produced by the motor M and a control unit 3 that supplies power to the motor M based on a signal from the rotation detection sensor 2 or a signal from an operation switch 4. The rotation detection sensor 2 outputs a pulse signal in accordance with the rotation of the motor M to the control unit 3. The control unit 3 is connected to a vehicle ECU 5 by the operation switch 4. The control unit 3 drive-controls the motor M by executing various types of control while recognizing the position and speed of the window glass WG using the input pulse signal. The control unit 3 may be circuitry including: 1) one or more processors that execute various processes according to a computer program (software); 2) one or more dedicated hardware circuits (application-specific integrated circuits: ASIC) that execute at least part of various processes, or 3) a combination thereof. The processor includes a CPU and memory such as RAM and ROM. The memory stores program codes or commands configured to cause the CPU to execute processes. The memory, or computer-readable media, includes any type of media that is accessible by general-purpose computers or dedicated computers.

The control unit 3, when determining that the window glass WG has entrapped a foreign object, stops the window glass WG and then reversely drives the window glass WG by a preset reversing amount, that is, executes entrapment prevention control to perform an opening action. In other words, the power window controller 1 of the present embodiment has an entrapment prevention functionality that executes the entrapment prevention control. The range in which the control unit 3 enables the entrapment prevention functionality excludes a dead zone that is set in accordance with a stored fully closed position. The dead zone is set to, for example, a range extending upward from a position located 5 to 15 mm below the stored fully closed position.

The control unit 3 executes an initialization process that stores a fully open position and a fully closed position of the window glass WG when an initialization request signal is input.

Specifically, in, for example, an assembly plant, the control unit 3 determines that a first one of signals input when the operation switch 4 is operated to perform an automatic opening action is an initialization request signal and starts an initialization process.

In the initialization process, the control unit 3 first opens the window glass WG and stores a lock position as a fully open position that is a mechanical movement limitation position at the fully open side when the window glass WG opens. Then, the control unit 3 enables the entrapment prevention functionality and closes the window glass WG until entrapment is detected. The control unit 3 executes entrapment reversing control that opens the window glass WG when entrapment is detected during the closing action of the window glass WG. More specifically, the control unit 3 opens the window glass WG by a preset reversing amount when detecting entrapment resulting in an increase in load as the window glass WG abuts a window frame or the like. After the entrapment reversing control, the control unit 3 closes the window glass WG. The control unit 3 stores a lock position as a fully closed position that is a mechanical movement limitation position at the fully closed side when the window glass WG closes.

When the window glass WG closes after the entrapment reversing control, the control unit 3 enables the entrapment prevention functionality in the range excluding an entrapment detection disabling range that is set based on the position where entrapment is detected during the entrapment reversing control or the position where entrapment is detected and the window glass WG is stopped. In this case, the control unit 3 stores the entrapment detection position as a provisional fully closed position and uses the entrapment detection disabling range to set the dead zone of the entrapment prevention functionality. In other words, after the entrapment reversing control, the control unit 3 stores the entrapment position, which is where load increases as the window glass WG abuts the window frame undergoing the entrapment reversing control, as the provisional fully closed position, sets the dead zone corresponding to the stored provisional fully closed position as the entrapment detection disabling range, enables the entrapment prevention functionality in a range excluding the entrapment detection disabling range, and closes the window glass WG.

Further, when the window glass WG is opened in the entrapment reversing control and the window glass WG reaches the fully open position, the control unit 3 determines that the provisional fully closed position is set further than expected toward the opening side and thus determines that the initialization is incomplete. Further, when the lock position of the window glass WG closed after the entrapment reversing control is not within a preset lock range that is expected, the control unit 3 determines that the initialization is incomplete.

Further, the control unit 3 determines during the initialization that the initialization is incomplete under a situation satisfying at least one of a condition in which the operation switch 4 is operated, for example, when an initialization suspension signal is input by the vehicle ECU 5, a condition in which a voltage drop over a preset value or greater occurs, and a condition in which the vehicle door D is opened or closed.

When the control unit 3 determines that the initialization is incomplete, the control unit 3 opens the window glass WG, outputs an initialization incompletion signal to, for example, the vehicle ECU 5, and then ends the process.

The actions and operations of the control unit 3 will now be described in detail.

Figure 4:
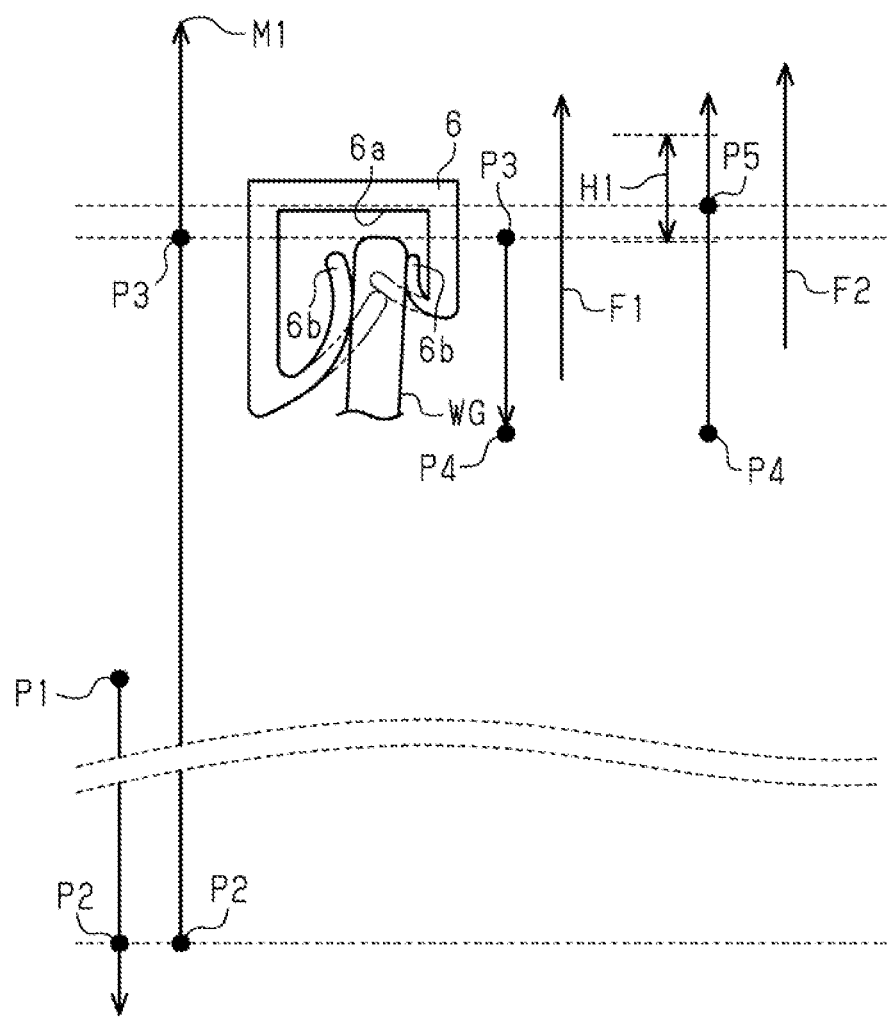
FIG. 4 is a diagram illustrating an initialization process of the controller according to one embodiment.
Figure 5A:
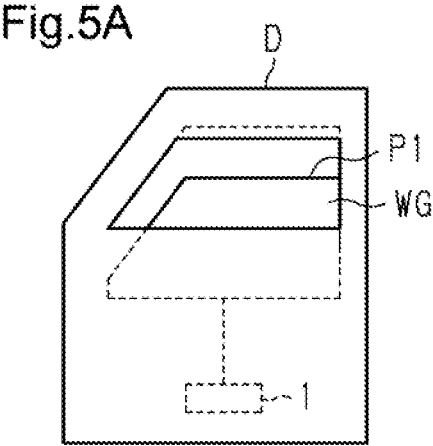
FIG. 5A to 5E are schematic diagrams illustrating actions of a window glass (WG) according to one embodiment.

As shown in FIGS. 4 and 5A, the window glass WG is generally located at an intermediate position P1 of an opening-closing range in, for example, an assembly plant or the like.

When a worker operates the operation switch 4 to perform an automatic opening action, a signal is input to the control unit 3 as an initialization request signal. The control unit 3 then executes the initialization process illustrated in FIG. 2.

Figure 2:
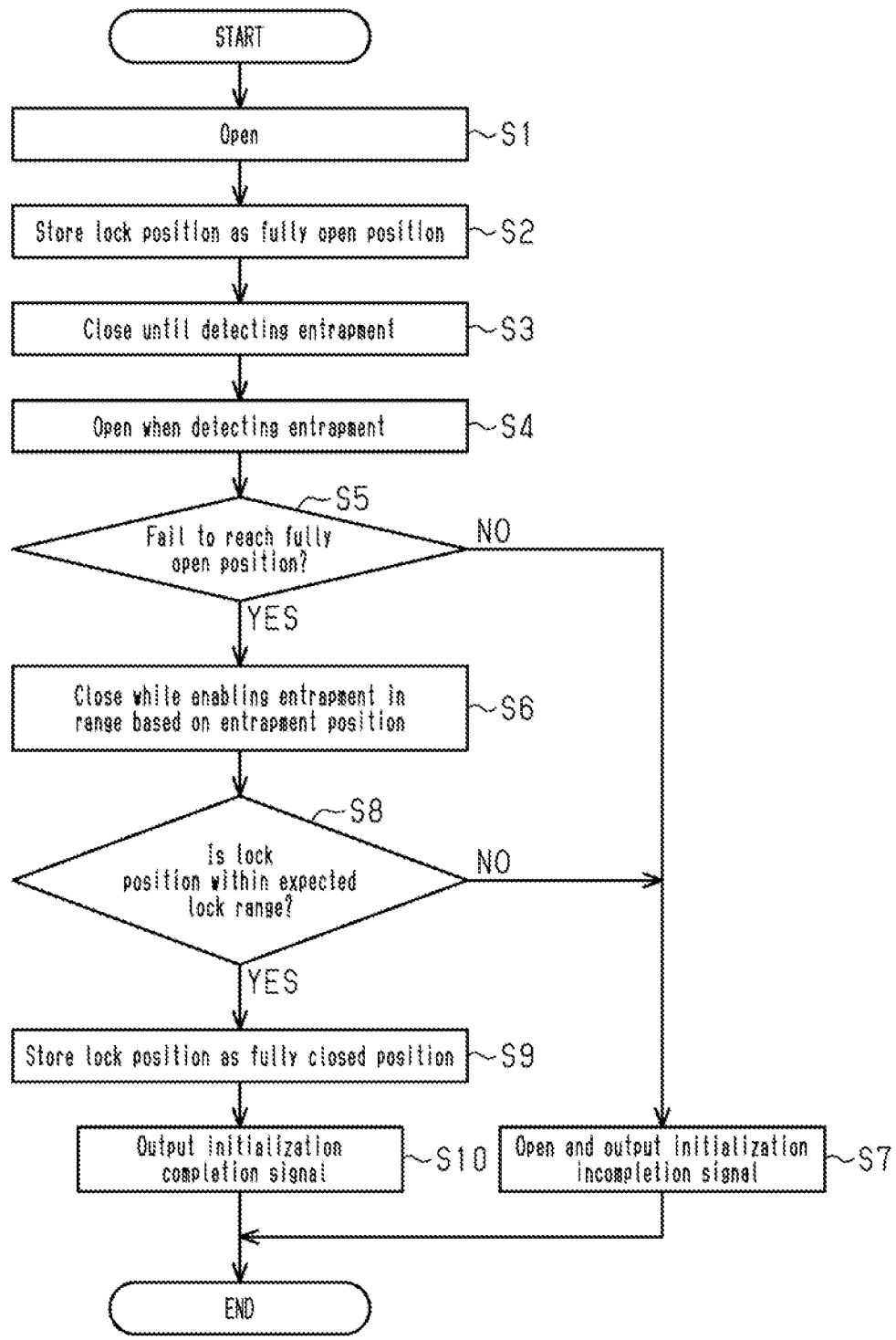
FIG. 2 is a flowchart illustrating an initialization process of a controller according to one embodiment.
Figure 5B:
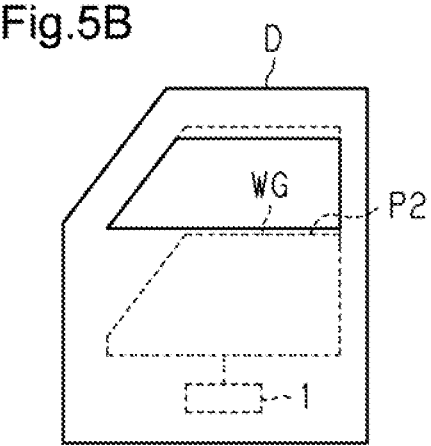

More specifically, as shown in FIG. 2, in step S1, the control unit 3 opens the window glass WG and proceeds to step S2. In step S1, the control unit 3 opens the window glass WG until the window glass WG locks. As shown in FIG. 5B, the window glass WG opens to a fully open position P2 where the window glass WG reaches and stops at the mechanical movement limitation position.

In step S2, the control unit 3 stores the lock position as the fully open position when the window glass WG opens. Then, the control unit 3 proceeds to step S3.

In step S3, the control unit 3 closes the window glass WG from the fully open position P2 until entrapment is detected. The control unit 3 stores the position at which the entrapment is detected or the position at which the entrapment is detected when the window glass WG stops as a provisional fully closed position P3 that serves as an entrapment position and proceeds to step S4. In step S3, the control unit 3 enables the entrapment prevention functionality and closes the window glass WG until the entrapment prevention functionality starts to function.

Figure 5C:
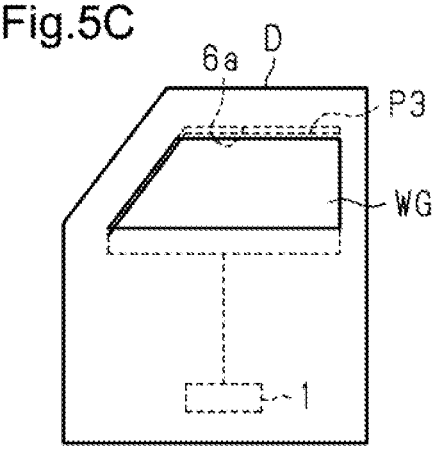

Specifically, as shown in FIG. 4, in step S3, the control unit 3 does not set the dead zone in the vicinity of the fully closed position, which is based on the fully open position, when closing the window glass WG toward the fully closed side or cancel detection of the dead zone when closing the window glass WG toward the fully closed position side M1. This ensures that entrapment is detectable, and the control unit 3 closes the window glass WG until the entrapment prevention functionality starts to function. In this case, a sliding load mainly generated by sliding pieces 6b of a weather strip 6 acts on the window glass WG and slows the movement speed of the window glass WG before the window glass WG reaches a restriction surface 6a. When the rotation detection sensor 2 detects the decrease in the movement speed, the entrapment prevention functionality stops the window glass WG at the provisional fully closed position P3 that is located before the fully closed position as shown in FIG. 5C. As long as the window glass WG is not stopped, the entrapment prevention functionality will function when the window glass WG hits the restriction surface 6a and stop the window glass WG.

Figure 5D:
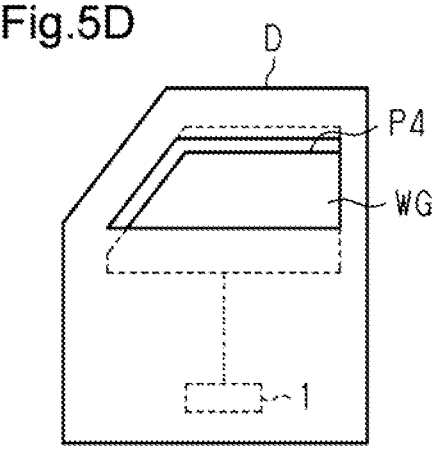

In step S4, the control unit 3 executes entrapment reversing control that opens the window glass WG as an action of the entrapment prevention functionality and proceeds to step S5. In this case, the control unit 3 opens the window glass WG by a preset reversing amount, for example, 100 mm so that the window glass WG is stopped at an intermediate position P4 as shown in FIG. 5D. In this case, the control unit 3 also sets an entrapment detection disabling range F1 as the dead zone extending upward and downward over a predetermined distance from the stored provisional fully closed position P3 as shown in FIG. 4.

In step S5, the control unit 3 determines whether the window glass WG has failed to reach the fully open position. When determining that the window glass WG has failed to reach the fully open position, the control unit 3 proceeds to step S6. When determining that the window glass WG has reached the fully open position, the control unit 3 determines that the initialization is incomplete and proceeds to step S7, which will be described later.

Figure 5E:
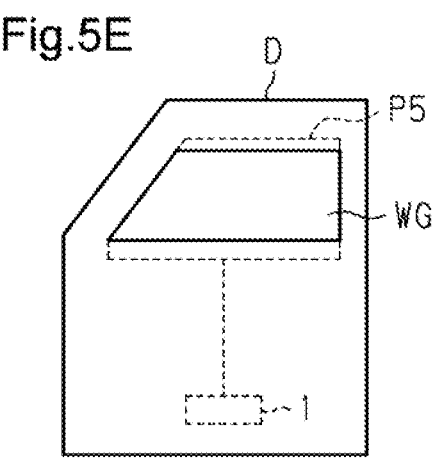

In step S6, the control unit 3 closes the window glass WG and proceeds to step S8. In step S6, the control unit 3 closes the window glass WG while enabling the entrapment prevention functionality in a range excluding the entrapment detection disabling range F1, the range of which is based on the entrapment position obtained when executing the entrapment reversing control as described above. In this case, the window glass WG slides along the sliding pieces 6b in the entrapment detection disabling range F1. Thus, the window glass WG closes until it hits the restriction surface 6a and becomes locked. The window glass WG is stopped at a fully closed position P5 as shown in FIG. 5E.

In step S8, the control unit 3 determines whether the lock position of the window glass WG when closed is within a preset expected lock range H1. When determining that the lock position is within the expected lock range H1, the control unit 3 proceeds to step S9. When determining that the lock position is not within the expected lock range H1, the control unit 3 determines that the initialization is incomplete and proceeds to step S7. The expected lock range H1 is set to a range based on the provisional fully closed position P3, which has been stored in advance, for example, a range extending 10 mm upward from the provisional fully closed position P3 stored in advance.

In step S9, the control unit 3 stores the lock position as the fully closed position obtained from the closing action of the window glass WG performed for the second time as a result of step S6 and then proceeds to step S10.

In step S10, the control unit 3 outputs an initialization completion signal to, for example, the vehicle ECU 5 and ends the process. When the initialization process ends in this manner, the control unit 3 has stored the fully open position P2, the fully closed position P5, a full stroke distance from the fully open position P2 to the fully closed position P5, and the like. This allows a dead zone F2 to be set in accordance with the stored fully closed position P5. Thus, the entrapment prevention functionality, a functionality that slows the window glass WG immediately before the window glass WG reaches the fully closed position P5, and the like function properly.

In step S7, the control unit 3 opens the window glass WG by a preset amount and outputs an initialization incompletion signal, for example, to the vehicle ECU 5 and ends the process. When the initialization process ends in a proper manner, the window glass WG is stopped at the fully closed position. Thus, when the window glass WG is not at the fully closed position, the worker can visually recognize that the initialization process has not ended in a proper manner.

Figure 3:
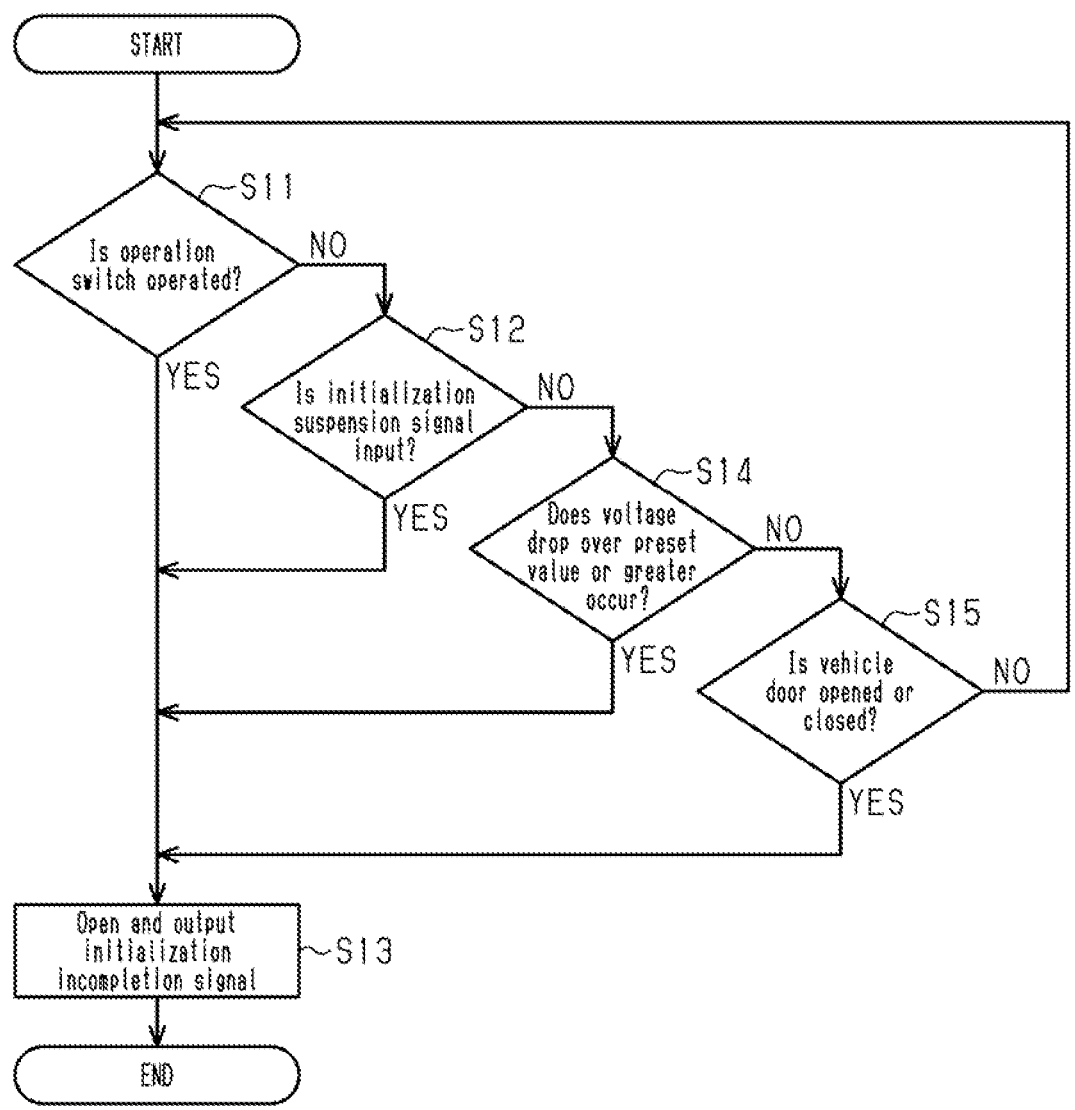
FIG. 3 is a flowchart illustrating an initialization cancellation determination process of the controller according to one embodiment.

The control unit 3 executes an initialization cancellation determination process shown in FIG. 3 at the same time as when executing the initialization process.

Specifically, as shown in FIG. 3, in step S11, the control unit 3 determines whether the operation switch 4 has been operated during the initialization process. When determining that the operation switch 4 has not been operated, the control unit 3 proceeds to step S12. When determining that the operation switch 4 has been operated, the control unit 3 determines that the initialization is incomplete and proceeds to step S13, which will be described later.

In step S12, the control unit 3 determines whether an initialization suspension signal has been input by, for example, the vehicle ECU 5 during the initialization process.

When determining that an initialization suspension signal has not been input, the control unit 3 proceeds to step S14. When determining that an initialization suspension signal has been input, the control unit 3 determines that the initialization is incomplete and proceeds to step S13, which will be described later.

In step S14, the control unit 3 determines whether a voltage drop over a preset value or greater has occurred during the initialization process. When determining that there was no such voltage drop, the control unit 3 proceeds to step S15. When determining that there was a voltage drop, the control unit 3 determines that the initialization is incomplete and proceeds to step S13 described later.

In step S15, the control unit 3 determines whether the vehicle door D has been opened or closed during the initialization process, specifically, whether the vehicle door D has been opened from a closed state or closed from an open state. When determining that the vehicle door D has not been opened or closed, the control unit 3 returns to step S11. When determining that the vehicle door D has opened or closed, the control unit 3 determines that the initialization is incomplete and proceeds to step S13.

In step S13, the control unit 3 opens the window glass WG by a preset amount and outputs an initialization incompletion signal, for example, to the vehicle ECU 5 and ends the process. That is, the initialization cancellation determination process constantly monitors the above conditions during the initialization process. When one of the conditions is satisfied, the initialization cancellation determination process interrupts the initialization process and forcibly ends the initialization process.

The embodiment has the following advantages.

(1) The control unit 3 executes the initialization process while enabling the entrapment prevention functionality. Thus, the control unit 3 detects entrapment even when, for example, a foreign object is entrapped during a closing action performed for the first time during the initialization process. Further, the entrapment reversing control is executed in the vicinity of the fully closed position when a closing action is performed for the first time. This allows adjustments to be made to, for example, the weather strip 6 or the like, which is an elastic member, by sliding the window glass WG to spread the silicone applied to the weather strip 6 or by correcting warping of the weather strip 6. After such adjustments are made and when or subsequent to a closing action performed for the second time, the control unit 3 stores the lock position of the window glass WG as the fully closed position. This correctly stores the fully closed position and reduces the adverse effects of the weather strip 6 in the initial state.

(2) The control unit 3 closes the window glass WG after the entrapment reversing control during the initialization process. This reduces the work performed by the worker in comparison with when, for example, the worker operates the operation switch 4 to close the window glass WG after the entrapment reversing control, thereby simplifying initialization.

(3) The control unit 3 has the entrapment prevention functionality that opens the window glass WG by a set reversing amount when entrapment is detected. The entrapment reversing control during the initialization process uses the entrapment prevention functionality. Since an additional dedicated control program is not necessary, the control program volume is decreased.

(4) When the control unit 3 closes the window glass WG after the entrapment reversing control during the initialization process, the control unit 3 enables the entrapment prevention functionality in the range excluding the entrapment detection disabling range F1, which is based on the position where entrapment was detected for the first time in the entrapment reversing control. Thus, even when a foreign object is entrapped in a closing action after the entrapment reversing control, entrapment detection is ensured. Further, the entrapment prevention functionality is not enabled in the entrapment detection disabling range F1, which is based on the position where entrapment was detected in the entrapment reversing control. This prevents the load generated by the sliding or abutment of the window glass WG relative to the weather strip 6 or the like from reversing the window glass WG and allows the closing action of the window glass WG to be performed until reaching the lock position or the fully closed position.

(5) The control unit 3 stores the position where entrapment is detected as the provisional fully closed position P3 for the entrapment prevention functionality and sets the entrapment detection disabling range F1 as the dead zone for the entrapment prevention functionality. Since an additional dedicated control program is not necessary, the control program volume is decreased in comparison with a case in which, for example, an entrapment detection disabling range is set exclusively for the initialization process.

(6) The control unit 3 determines that the initialization is incomplete when the window glass WG undergoing an opening action reaches the fully open position in the entrapment reversing control during the initialization process. This prevents the initialization process from being erroneously completed in a case in which the entrapment reversing control is executed at a position greatly separated from the fully closed position.

(7) When the lock position of the window glass WG undergoing a closing action after the entrapment reversing control during the initialization process is not within the expected lock range H1, the control unit 3 determines that the initialization is incomplete. This avoids a situation in which an unexpected action results in erroneous storage of the fully closed position.

(8) The control unit 3 determines during the initialization process that the initialization is incomplete under a situation satisfying at least one of a condition in which the operation switch 4 is operated, a condition in which an initialization suspension signal is input, a condition in which a voltage drop over a preset value or greater occurs, and a condition in which the vehicle door D is opened or closed. Thus, the initialization process is not completed when it is difficult to store the fully closed position with high accuracy.

(9) The control unit 3 outputs an initialization incompletion signal when determining that the initialization is incomplete. This allows the worker to recognize that the determination is incomplete through the vehicle ECU 5 that receives the initialization incompletion signal or the like.

(10) The control unit 3, when determining that the initialization is incomplete, opens the window glass WG. Thus, the worker can recognize through visual observation that the initialization process, which usually ends at the fully closed position, did not end in a proper manner, that is, the initialization process is determined as incomplete. This eliminates a display device dedicated to an initialization failure.

(11) When starting the initialization process, when an initialization request signal is input, the control unit 3 first opens the window glass WG and then stores a lock position as a fully open position when the window glass WG is opened. This stores the fully open position while reducing the amount of work performed by the worker in comparison with a case in which the worker continues to operate the operation switch 4 to open the window glass WG to the lock position. Then, the control unit 3 automatically closes the window glass WG until entrapment is detected and executes the entrapment reversing control. This reduces the amount of work performed by the worker in comparison with when the worker continues to operate the operation switch 4 until entrapment is detected, thereby simplifying initialization. Thus, in the present embodiment, the control unit 3 automatically performs the entire initialization process to simplify initialization.

The above-described embodiments may be modified as follows. The above-described embodiments and the following modifications can be combined as long as the combined modifications remain technically consistent with each other.

The control unit 3 of the above embodiment may execute the entrapment reversing control two times or more during the initialization process.

Figure 6:
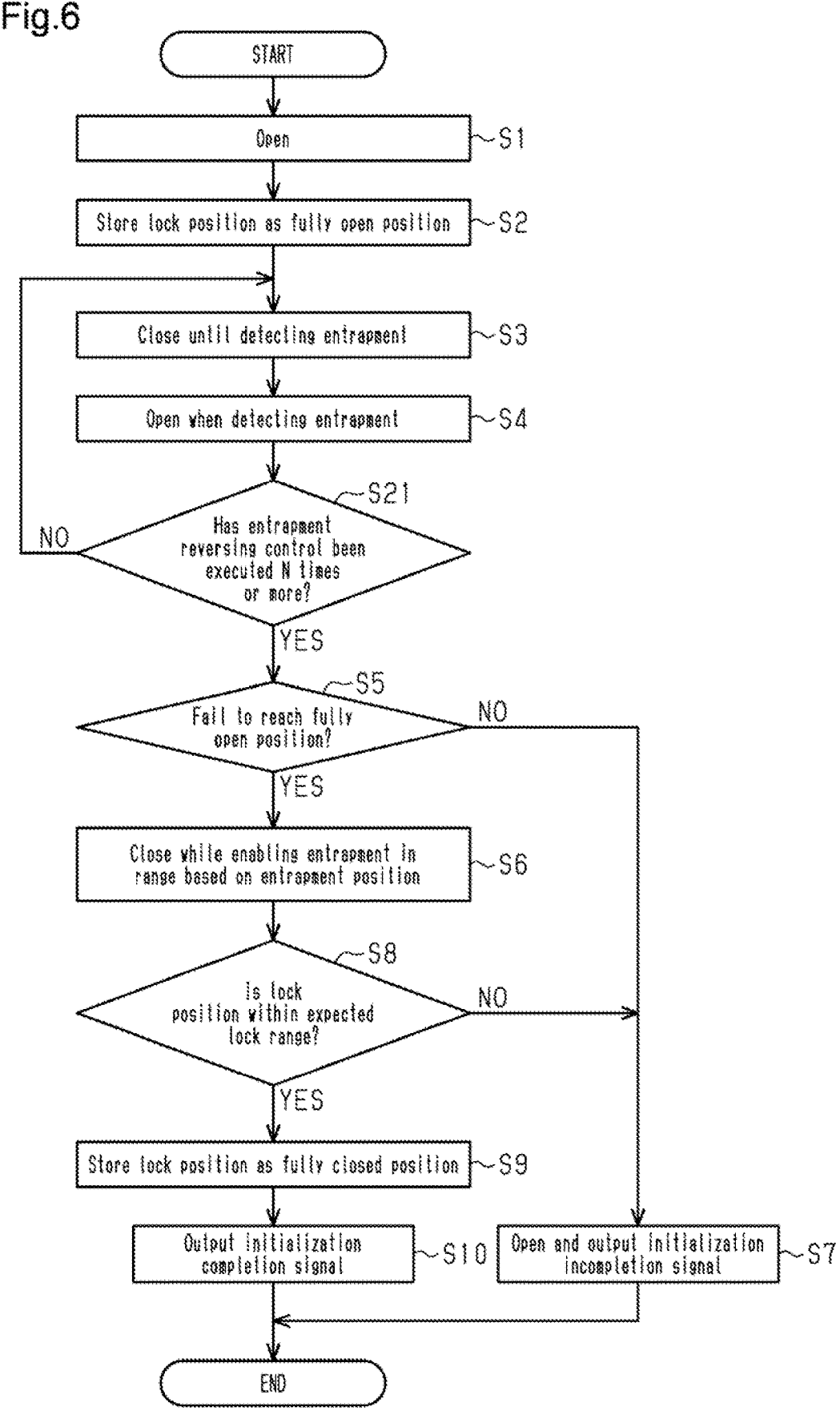
FIG. 6 is a flowchart illustrating a further example of an initialization process of the controller.

As shown in FIG. 6, the control unit 3 may proceed to step S21 after step S4. In step S21, the control unit 3 determines whether the control unit 3 has executed the entrapment reversing control N times or more (where N is natural number of 2 or greater). When determining that the control unit 3 has executed the entrapment reversing control N times or more, the control unit 3 proceeds to step S5. When determining that the control unit 3 has not executed the entrapment reversing control N times or more, the control unit 3 proceeds to step S3.

In this manner, the entrapment reversing control is executed two times or more. Thus, further adjustments can be made to a member such as the weather strip 6 or the like in its initial state as compared with when the entrapment reversing control is executed once. Then a lock position in the following closing action is stored as the fully closed position. This stores the fully closed position further accurately and eliminates the effects of the weather strip 6 in the initial state.

Figure 7:
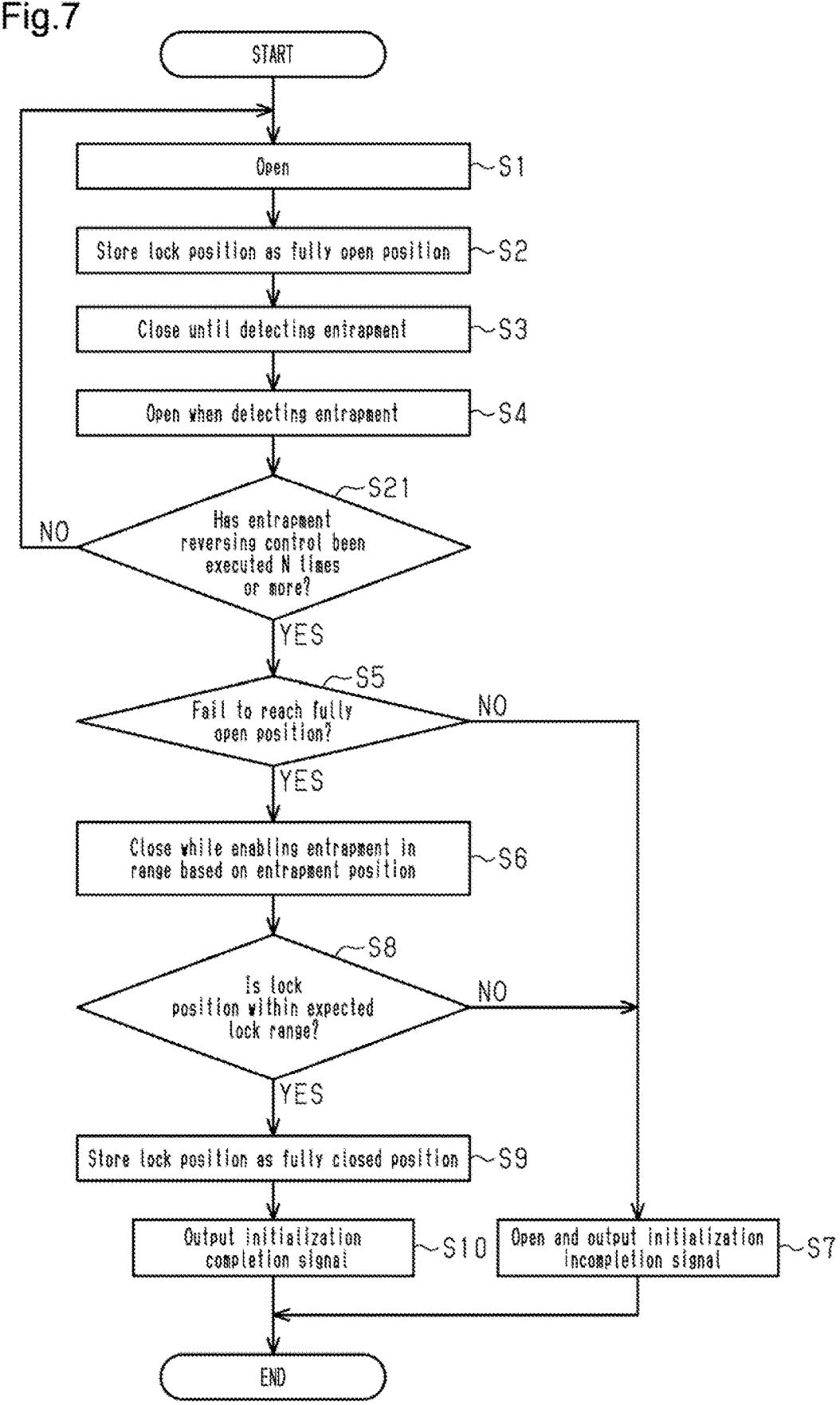
FIG. 7 is a flowchart illustrating a further example of an initialization process of the controller.

Further, as shown in FIG. 7, when determining that the control unit 3 has not executed the entrapment reversing control N times or more in step S21 of the further example described above (refer to FIG. 6), the control unit 3 may proceed to step S1.

Further, in the further examples described above (FIGS. 6, 7), N is a natural number of 2 or greater, and the control unit 3 determines whether the control unit 3 has executed the entrapment reversing control two times or more in step S21. However, the control unit 3 may determine whether the control unit 3 has executed the entrapment reversing control one time. That is, the control unit 3 may determine whether an opening action has been actually performed by the entrapment reversing control in step S21.

When determining that initialization is incomplete, the control unit 3 of the above embodiment may execute the initialization process at least one time again from the beginning or during the initialization process.

Figure 8:
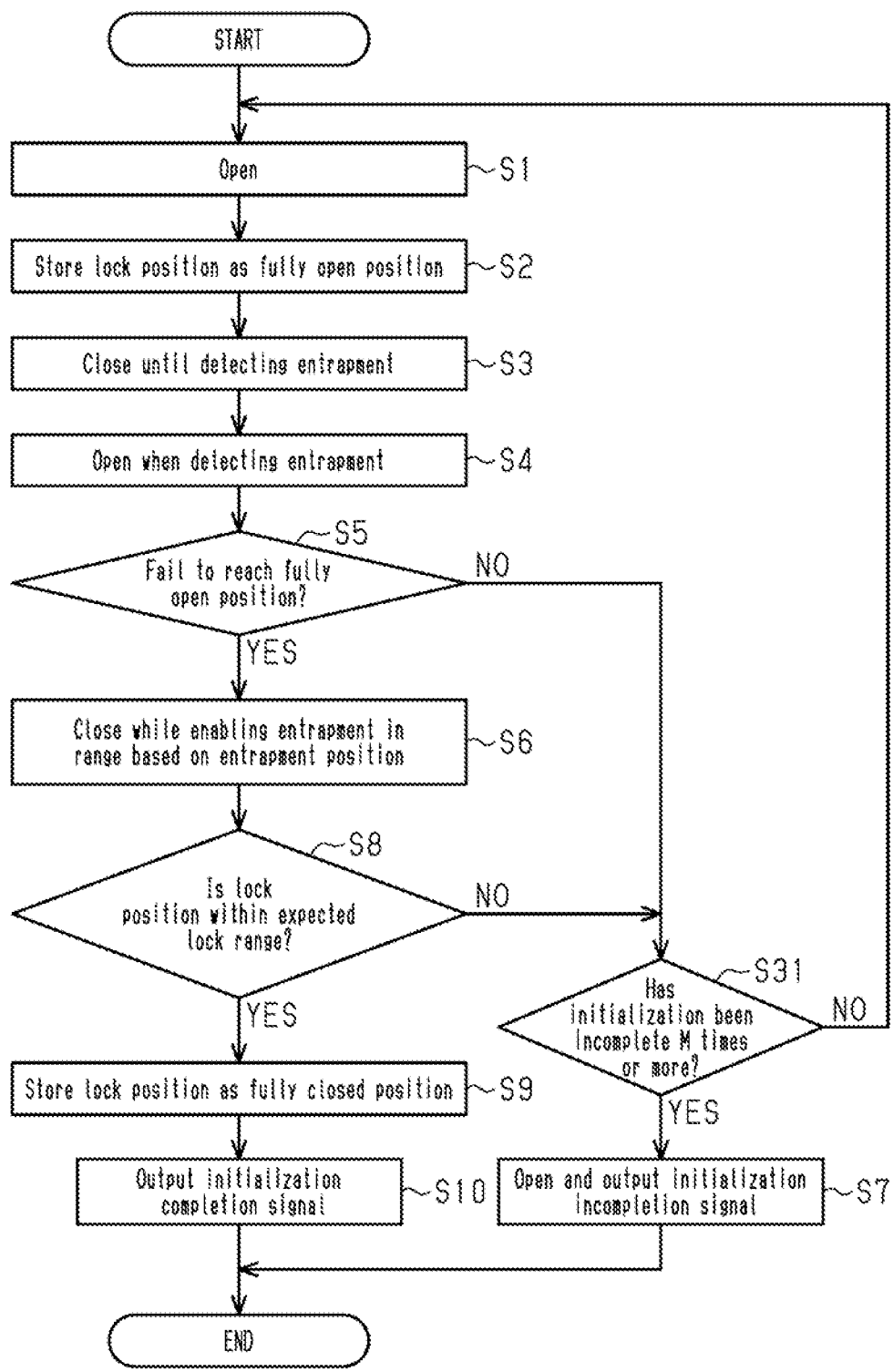
FIG. 8 is a flowchart illustrating a further example of an initialization process of the controller.

For example, as shown in FIG. 8, when determining that the window glass WG has reached the fully open position in step S5 or when determining that the lock position is not within the expected lock range H1 in step S8, the control unit 3 may determine that the initialization is incomplete and then proceed to step S31. The control unit 3 in step S31 determines whether the initialization has been incomplete M times or more (where M is natural number of 2 or greater). When determining that the initialization is incomplete M times or more, the control unit 3 proceeds to step S7. When determining that the initialization is not incomplete M times or more, the control unit 3 proceeds to step S1.

Figure 9:
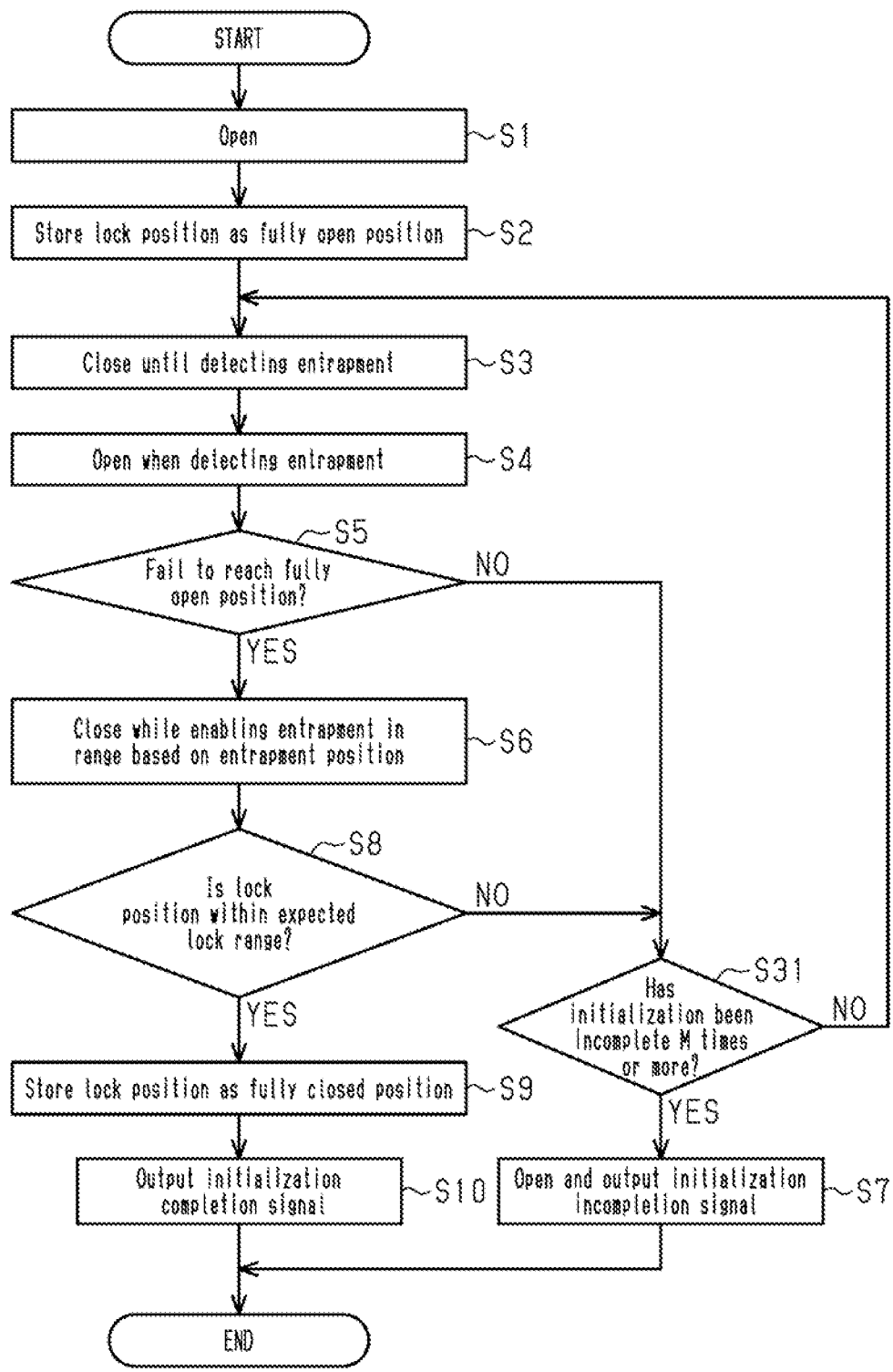
FIG. 9 is a flowchart illustrating a further example of an initialization process of the controller.

Further, as shown in FIG. 9, when determining that the initialization has not been incomplete M times or more in step 31 of the further example (refer to FIG. 8), the control unit 3 may proceed to step S3.

In this manner, even when incomplete initialization is determined one time, the initialization process will be executed at least one time again from the beginning or during the initialization process. For example, when incomplete initialization is determined one time, the initialization process will be executed again without requiring the worker to perform any operation.

Figure 10:
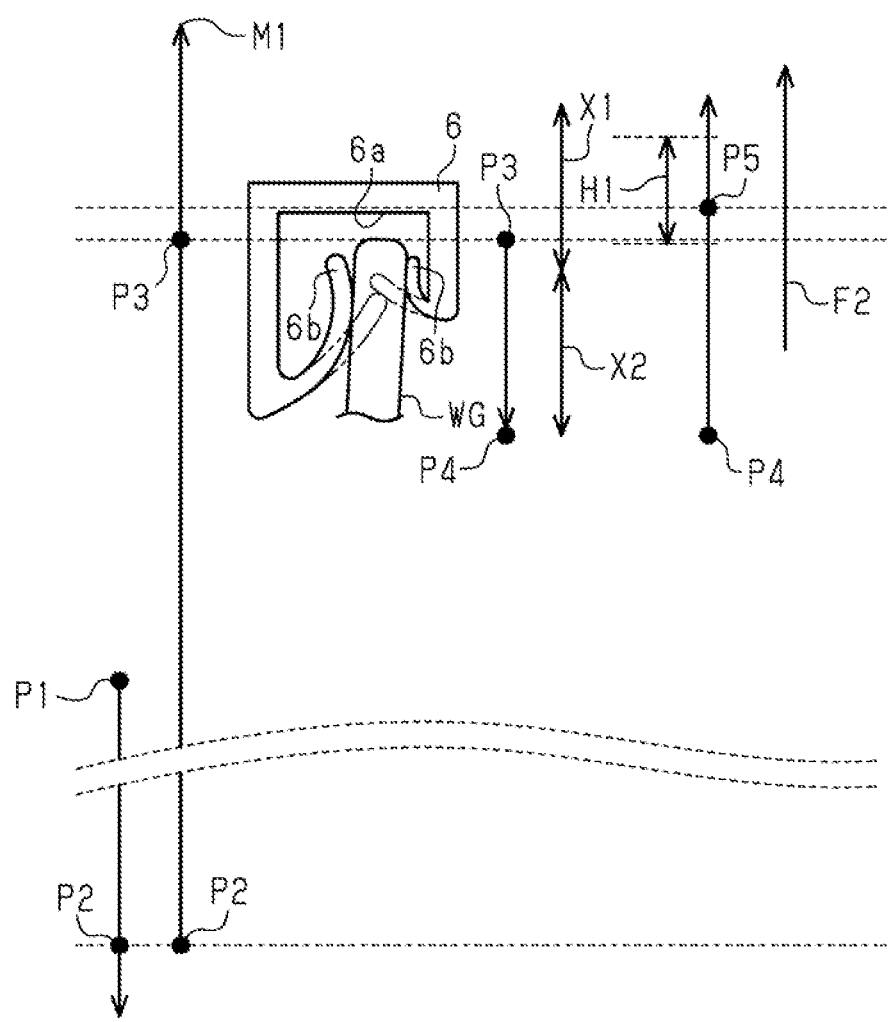
FIG. 10 is a diagram illustrating a further example of an initialization process of the controller.

In the above embodiment, the control unit 3 sets the dead zone for the entrapment prevention functionality to the entrapment detection disabling range F1. Instead, as shown in FIG. 10, the control unit 3 may set an entrapment detection disabling range X1 and an entrapment detection enabling range X2 that are dedicated to the initialization process based on an entrapment position. That is, the control unit 3 may set the entrapment detection disabling range X1 dedicated to the initialization process regardless of the dead zone of the entrapment prevention functionality.

This allows the optimal entrapment detection disabling range to be set as compared with when using the dead zone of the entrapment prevention functionality.

Further, in the above embodiment and further examples, the entrapment position is stored as the provisional fully closed position P3 and the entrapment detection disabling range F1 or X1 is set directly from the fully closed position. Instead, the entrapment detection disabling range may be set from the position where the opened window glass WG stops in the entrapment reversing control.

In the above embodiment, the control unit 3 uses the entrapment prevention functionality to open the window glass WG by a set reversing amount in the entrapment reversing control of the initialization process. Instead, the control unit 3 may execute entrapment reversing control dedicated to the initialization process.

For example, in the entrapment reversing control during the initialization process, the control unit 3 may open the window glass WG only by a preset small amount and close the window glass WG without detecting entrapment after the entrapment reversing control.

Figure 11:
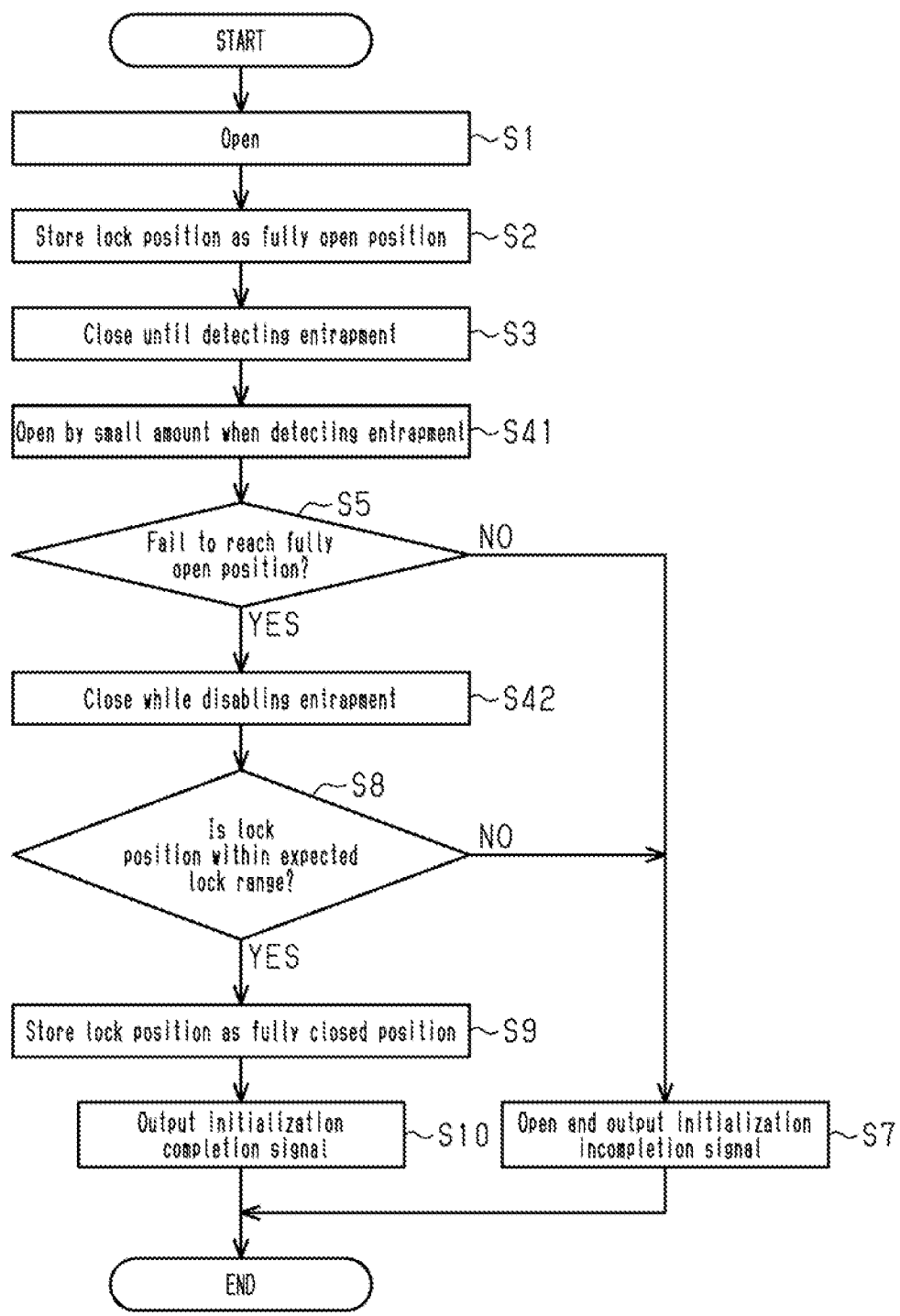
FIG. 11 is a flowchart illustrating a further example of an initialization process of the controller.
Figure 12:
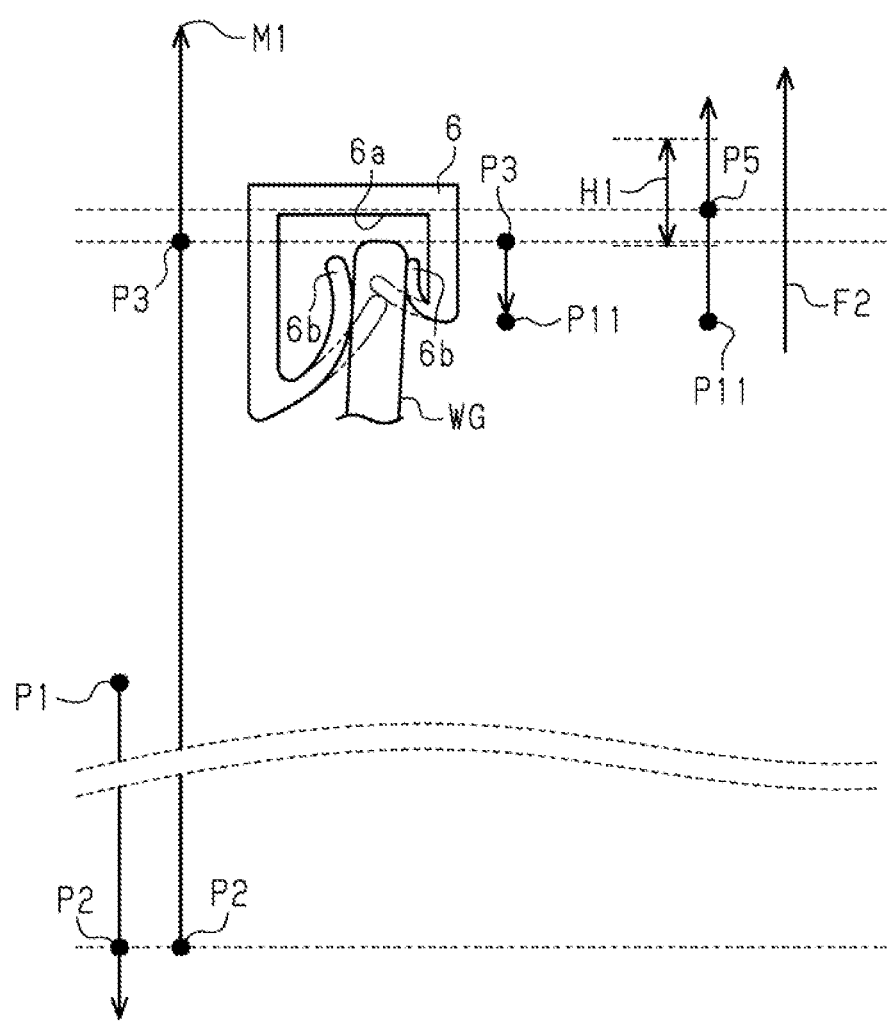
FIG. 12 is a diagram illustrating a further example of an initialization process of the controller.

Specifically, as shown in, for example, FIG. 11, the control unit 3 executes step S41 in place of step S4 in the above embodiment. In step S41, the control unit 3 executes an entrapment reversing control that opens the window glass WG only by a preset small amount from the entrapment position and then proceeds to step S5. The preset small amount is set to, for example, several millimeters so that a foreign object is unlikely to enter. As shown in FIG. 12, the window glass WG is stopped at a small amount reversed position P11. The control unit 3 executes step S42 in place of step S6. In step S42, the control unit 3 closes the window glass WG without performing entrapment detection and proceeds to step S8.

In this manner, a foreign object will not enter the entrapment position of the window glass WG after the entrapment reversing control. Initialization is finished within a short period through a simple control.

In the above embodiment, the control unit 3 starts the initialization process when an initialization request signal is input, opens the window glass WG, and stores a lock position as a fully open position when the window glass WG is opened. Instead, only a fully closed position may be stored.

Figure 13:
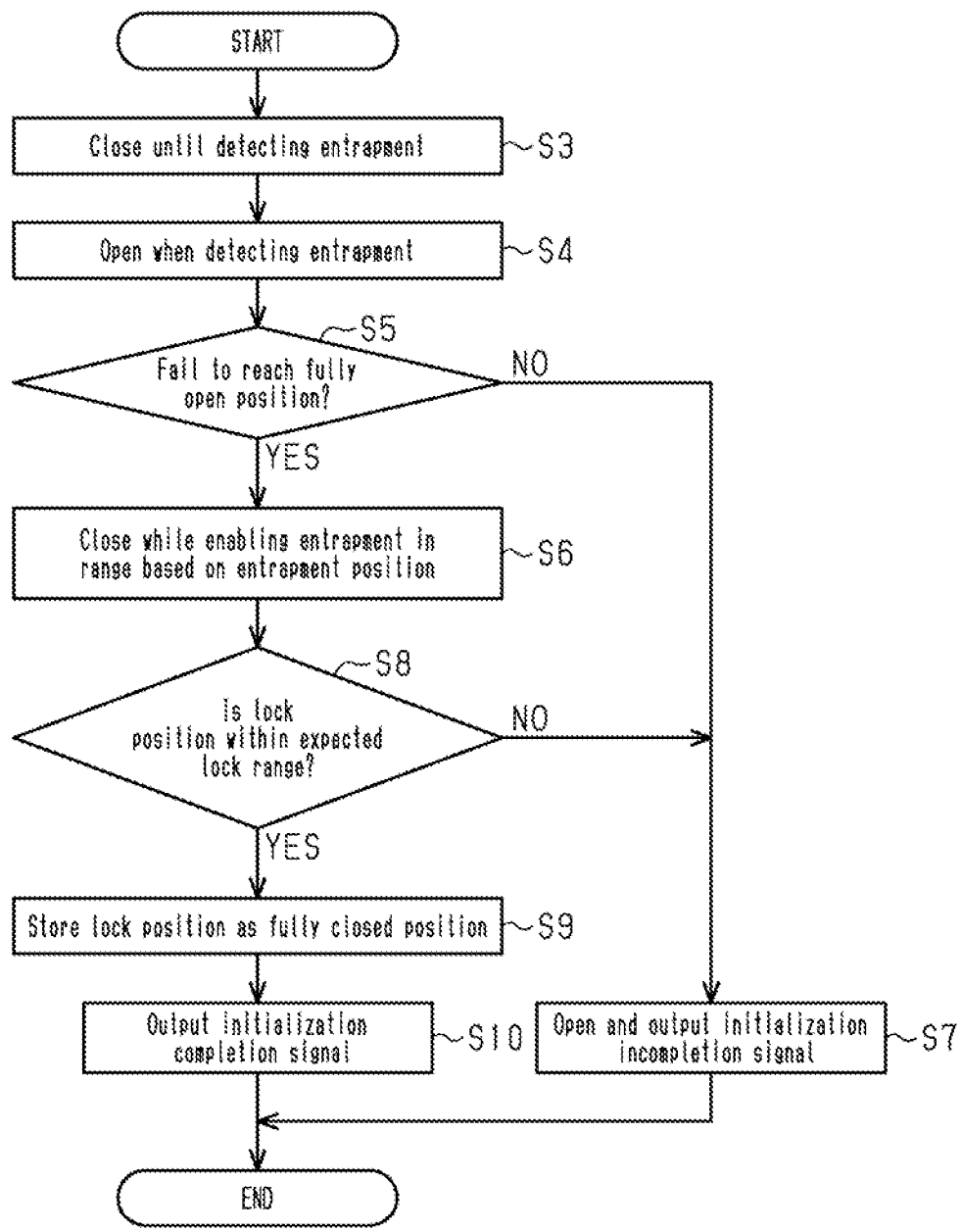
FIG. 13 is a flowchart illustrating a further example of an initialization process of the controller.

As shown in, for example, FIG. 13, the control unit 3 may start the initialization process when an initialization request signal is input and execute the process from step S3 of the above embodiment (refer to FIG. 2). The control unit 3 modified in this manner may store a position where locking occurs for the first time as a fully open position when opening the window glass WG.

In the above embodiment, the control unit 3 closes the window glass WG after the entrapment reversing control during the initialization process. Instead, the worker may close the window glass WG after the entrapment reversing control by operating the operation switch 4.

In the above embodiment, the control unit 3 opens the window glass WG when an initialization request signal is input and then closes the window glass WG until entrapment is detected. Instead, the worker may perform at least one of the actions by operating the operation switch 4.

In the above embodiment, the control unit 3 determines that initialization is incomplete when the window glass WG undergoing an opening action reaches the fully open position in the entrapment reversing control during the initialization process. However, this process does not need to be executed.

In the above embodiment, when the lock position of the window glass WG closed after the entrapment reversing control during the initialization process is not within the expected lock range H1, the control unit 3 determines that the initialization is incomplete. However, this process does not need to be executed.

In the above embodiment, the control unit 3 determines that the initialization is incomplete during the initialization process under a situation satisfying at least one of a condition in which the operation switch 4 is operated, a condition in which an initialization suspension signal is input, a condition in which a voltage drop over a preset value or greater occurs, and a condition in which the vehicle door D is opened or closed. However, this process does not need to be executed. Further, the control unit 3 may monitor only one to three of the four conditions including the condition in which the operation switch 4 is operated, the condition in which an initialization suspension signal is input, the condition in which a voltage drop over a preset value or greater occurs, and the condition in which the vehicle door D is opened or closed. The control unit 3 may determine that the initialization is incomplete when any of the three conditions is satisfied.

In the above embodiment, the control unit 3 outputs an initialization incompletion signal when determining that the initialization is incomplete. However, the control unit 3 does not need to output an initialization incompletion signal.

In the above embodiment, the control unit 3 opens the window glass WG when determining that initialization is incomplete. Instead, the control unit 3 does not need to open the window glass WG.

In the above embodiment, load information of the window glass WG such as speed information or the like at corresponding positions may be simultaneously stored during the initialization process. The load information such as speed information may be used as a threshold value for determining whether entrapment has occurred to improve the accuracy of the entrapment prevention functionality.

In the above embodiment, the control unit 3 is arranged integrally with the motor M and fixed to the vehicle door D. Instead, the control unit 3 may be separate from the motor M and located separately from the motor M to drive-control the motor M.

In the above embodiment, the present disclosure is applied to the power window controller 1 that serves as an opening-closing member controller. Instead, the present disclosure may be applied to an opening-closing member controller that drive-controls an opening-closing member other than the window glass WG.

While the present disclosure is described with reference to examples, the present disclosure is not limited to the example or the configuration of the example. The present disclosure includes various variations and modifications within an equivalent range. In addition, various combinations and forms and other combinations and forms, which include only one element or more, shall be within the scope or a range of ideas of the present disclosure.

The invention claimed is:

1. An opening-closing member controller comprising:
a control circuitry that executes an initialization process to store at least a fully closed position of an opening-closing member,
wherein, in the initialization process, the control circuitry closes the opening-closing member, executes entrapment reversing control one or more times when entrapment is detected to open the opening-closing member, and closes the opening-closing member after the entrapment reversing control to store a position where the opening-closing member locks as the fully closed position.

2. The opening-closing member controller according to claim 1, wherein the control circuitry closes the opening-closing member after the entrapment reversing control in the initialization process.

3. The opening-closing member controller according to claim 1, wherein
the control circuitry has an entrapment prevention functionality that opens the opening-closing member by a set reversing amount when entrapment is detected, and
the entrapment reversing control in the initialization process uses the entrapment prevention functionality.

4. The opening-closing member controller according to claim 1, wherein
the control circuitry has an entrapment prevention functionality that opens the opening-closing member by a set reversing amount when entrapment is detected, and
when closing the opening-closing member after the entrapment reversing control in the initialization process, the control circuitry enables the entrapment prevention functionality in a range excluding an entrapment detection disabling range, which is based on an entrapment position where the entrapment reversing control was executed.

5. The opening-closing member controller according to claim 4, wherein
when entrapment is detected in a range excluding a dead zone that is set in accordance with the stored fully closed position, the entrapment prevention functionality opens the opening-closing member by the set reversing amount, and
the control circuitry stores the entrapment position as a provisional fully closed position and sets the entrapment detection disabling range as the dead zone of the entrapment prevention functionality.

6. The opening-closing member controller according to claim 4, wherein the control circuitry sets an entrapment detection disabling range dedicated to the initialization process based on the entrapment position.

7. The opening-closing member controller according to claim 1, wherein, in the initialization process, the control circuitry opens the opening-closing member for a small preset amount during the entrapment reversing control and closes the opening-closing member without performing entrapment detection after the entrapment reversing control.

8. The opening-closing member controller according to claim 1, wherein the control circuitry executes the entrapment reversing control two or more times in the initialization process.

9. The opening-closing member controller according to claim 1, wherein, in the initialization process, the control circuitry determines that initialization is incomplete when closing the opening-closing member after the entrapment reversing control if the position where the opening-closing member locks is not within a preset expected lock range.

10. The opening-closing member controller according to claim 9, wherein the control circuitry outputs an initialization incompletion signal when determining that the initialization is incomplete.

11. The opening-closing member controller according to claim 9, wherein the control circuitry opens the opening-closing member when determining that the initialization is incomplete.

12. The opening-closing member controller according to claim 9, wherein the control circuitry executes the initialization process at least one time again from the beginning of the initialization process or during the initialization process when determining that the initialization is incomplete.

13. The opening-closing member controller according to claim 1, wherein, in the initialization process, the control circuitry determines that initialization is incomplete when opening the opening-closing member in the entrapment reversing control if the opening-closing member reaches a fully open position.

14. The opening-closing member controller according to claim 1, wherein, in the initialization process, the control circuitry determines that initialization is incomplete under a situation satisfying at least one of a condition in which an operation switch that opens and closes the opening-closing member is operated, a condition in which an initialization suspension signal is input, a condition in which a voltage drop over a preset value or greater occurs, and a condition in which a vehicle door is opened or closed.

15. The opening-closing member controller according to claim 1, wherein the control circuitry starts the initialization process when an initialization request signal is input and closes the opening-closing member until entrapment is detected to execute the entrapment reverse control.

16. The opening-closing member controller according to claim 1, wherein the control circuitry starts the initialization process when an initialization request signal is input, opens the opening-closing member and stores the position where the opening-closing member locks as a fully open position, and closes the opening-closing member until entrapment is detected to execute the entrapment reverse control.

17. An initialization method for storing at least a fully closed position of an opening-closing member in an opening-closing member controller, the initialization method comprising:
  executing entrapment reversing control one or more times that opens the opening-closing member if entrapment is detected when closing the opening-closing member; and
  storing a position where the opening-closing member locks when closing the opening-closing member after the entrapment reversing control as a fully closed position.

* * * * *